Aug. 7, 1945.  R. H. C. MOELLER  2,380,984
METHOD OF CANNING
Filed Aug. 9, 1941  3 Sheets-Sheet 1
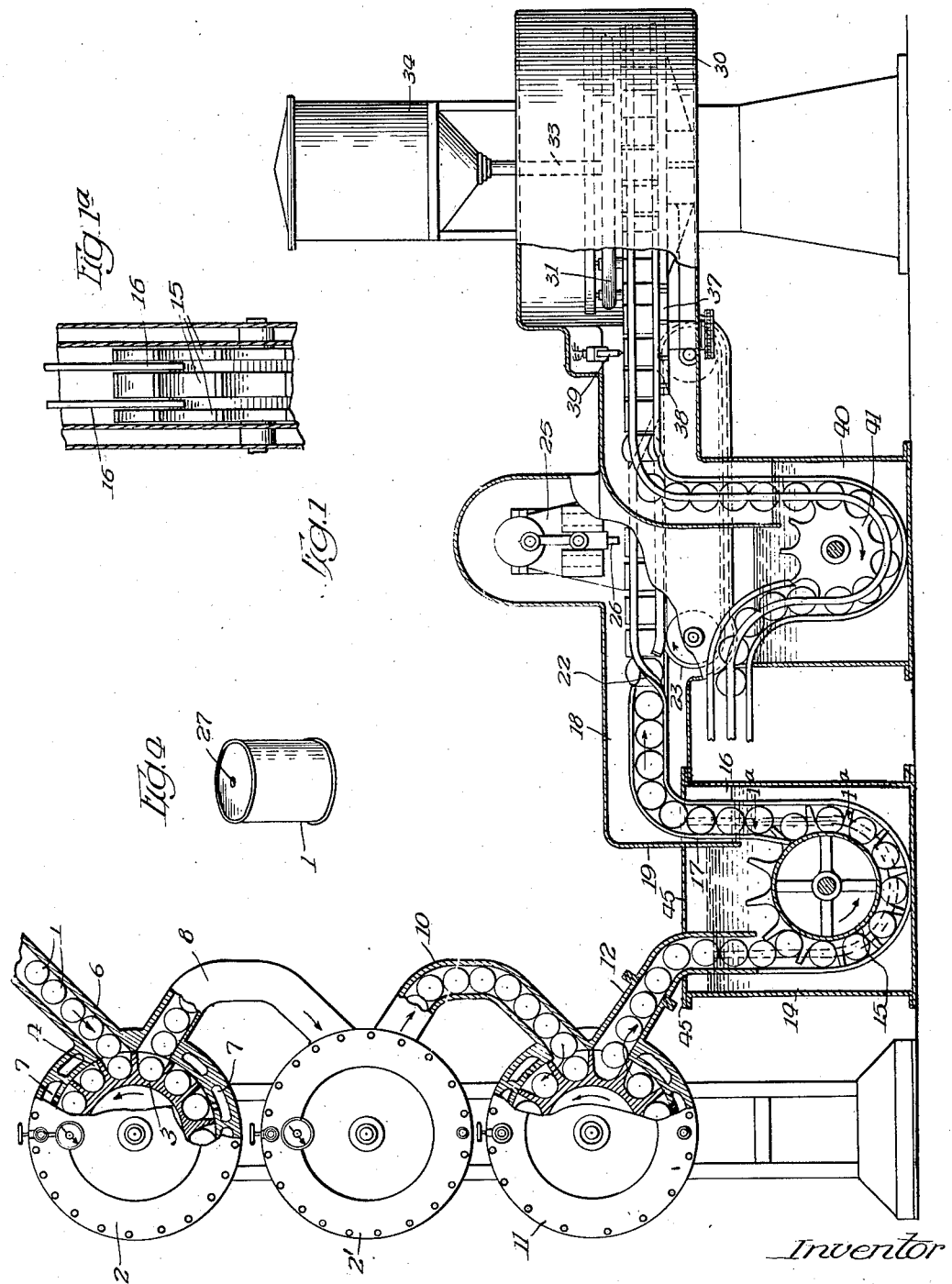
Inventor
Raymond H. C. Moeller
By Morris Spector
Atty

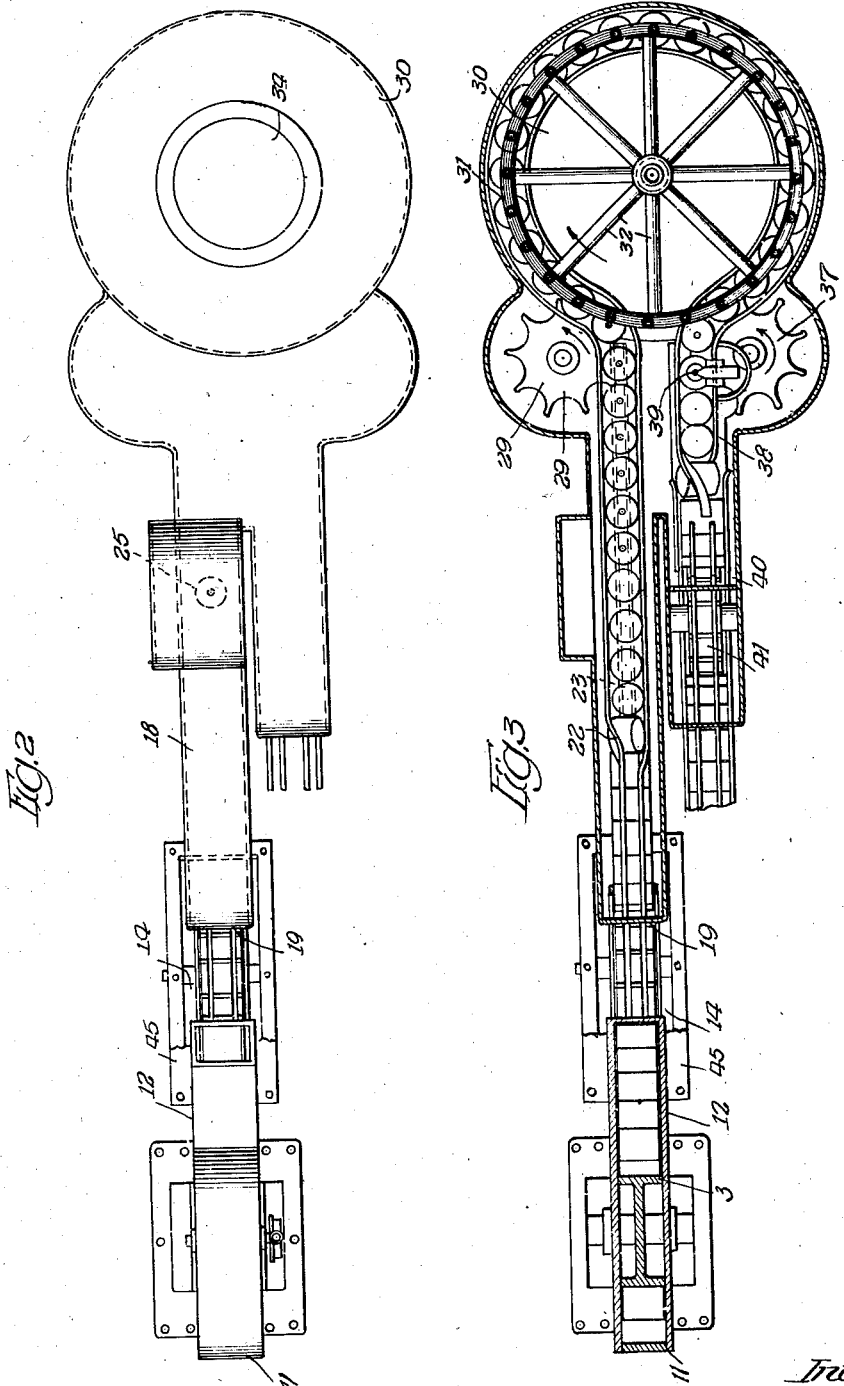

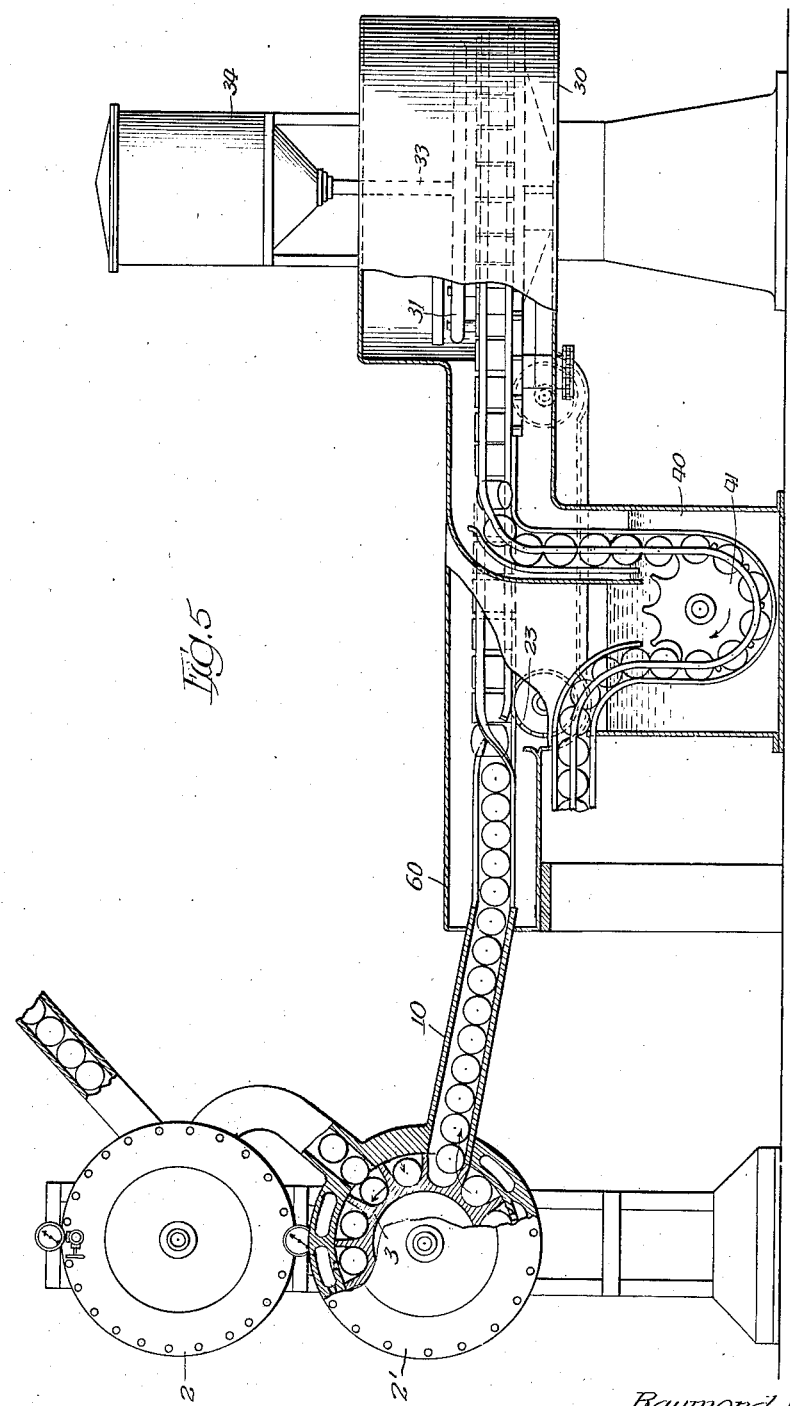

Patented Aug. 7, 1945

2,380,984

UNITED STATES PATENT OFFICE 2,380,984

METHOD OF CANNING

Raymond H. C. Moeller, Oak Park, Ill.

Application August 9, 1941, Serial No. 406,086

7 Claims. (Cl. 226—68)

This invention relates to apparatus for and method of canning, more particularly the canning of products which must be protected against the deteriorating action of micro-organisms. In its more specific aspects it is concerned with the canning of food products, especially liquid or semi-liquid food products.

In the art of canning liquid food products, especially milk or milk products, two different types of cans have been used. One type of can, commonly known as a "vent hole" can, is substantially completely preformed and has a filling opening or vent hole in the top thereof through which the milk is poured. Thereafter the filling opening is closed with a slug of solder or the like and then the canned contents are heated to the temperature required for sterilization. The sterilization is performed after the can with the milk therein has been sealed. The other type of can is an open top, commonly known as a "sanitary" can, which is sterilized, then filled with the sterile product and thereafter the top or lid of the can is applied and hermetically sealed in place around the periphery thereof. This type of can and canning process is by far more expensive than the first mentioned type. One of the objections inherent in the use of canning processes of the past which utilized completely preformed cans resided in the fact that the process required sterilization after the can had been filled. This left a distinctly burned or cooked flavor in the canned milk. It is an object of the present invention to provide a canning process which utilizes the first mentioned or cheaper type of can, that is, a preformed substantially closed can that is to be filled with the liquid products through a small opening therein, and will not require sterilization after canning. In accordance with the principles of the present invention the sterile milk is poured into a sterile can through an opening in a substantially closed can under aseptic conditions and the filling opening in the can is then sealed without exposing the can to the outside atmosphere. Therefore it is not necessary to reheat the canned product for sterilization purposes after sealing of the can.

In accordance with the present invention the preformed substantially closed cans are moved by a continuous process into a sterilizer which sterilizes the inside and the outside of the can, then cooled, then moved into a sterile chamber. If the cans do not already have a filling opening, a filling opening is pierced in the top of each can. The cans are then moved, within the sterile chamber, to a filling nozzle or the like which pours the sterile product into the can. Thereafter, and while the can is still in the sterile chamber, the filling opening is sealed as by a drop of solder or the like. The sterile chamber is filled with a sterile atmosphere which is preferably maintained at a pressure somewhat above atmospheric pressure. By maintaining the chamber at an elevated pressure the infiltration of atmospheric air into the chamber is positively avoided, since if any slight leak develops then the flow of gas will be from the chamber rather than into the chamber. The gas within the chamber may be previously sterilized air or may be a sterilized inert gas, such as, for instance, nitrogen or carbon dioxide. Suitable gas seals are provided at the can inlet and can outlet side of the chamber so as to permit a continuous flow of cans into the chamber and a continuous flow of cans out of the chamber while at the same time preventing any appreciable escape of the sterile gas from the chamber. This seal may comprise a rotary valve or a water seal.

The attainment of the above and further objects of the present invention will be apparent from the following specification taken in conjunction with the accompanying drawings forming a part thereof.

In the drawings:

Figure 1 is a diagrammatic elevational view, in partial section, of a canning system embodying the present invention;

Figure 1A is a fragmentary view taken along the line 1A—1A of Figure 1;

Figure 2 is a plan view of the structure of Figure 1, in partial section;

Figure 3 is a plan view with the covers or tops of the housings removed;

Figure 4 is a view of a pierced can ready for filling; and

Figure 5 is a diagrammatic elevational view, in partial section, illustrating a modified construction.

Reference may now be had more particularly to the embodiment illustrated in Figures 1, 2 and 3. The apparatus of Figure 1 is adapted to receive a preformed sealed can, consisting of a cylindrical body having a top closure and a bottom closure soldered or otherwise hermetically sealed thereto. Such cans are illustrated at 1. The cans 1 are fed into a sterilizer 2 where they are heated by live steam at a high pressure, for instance, fifty pounds. The sterilizer may be of any preferred construction. As illustrated, it consists of a rotary valve of a well known type, although any other preferred type of sterilizer may be used. Briefly, the sterilizer consists of an outer chamber within which is rotatably mounted a valve 3 having a plurality of pockets 4, one for each can. The valve 3 rotates in a counter-clockwise direction, as indicated by the arrow, and as each pocket comes opposite the filling chute 6 a can rolls thereinto. The can is then carried by the valve, through the steam chamber 7, and then discharged into a discharge conduit 8 which carries the cans into a second sterilizer 2' of a construction substantially identical with that of the sterilizer 2, except that the sterilizer 2' operates at a very much lower pressure, say, five pounds of steam pressure. The cans are discharged from the sterilizer 2' into a discharge conduit 10 which carries the cans to a water cooler 11. The water cooler may be of substantially the same construction as are the sterilizers 2 and 2'. In the water cooler 11 water is circulated around the outside of the cans to rapidly cool the same, and the cans are discharged from the cooler into a discharge conduit 12. When the cans enter the discharge conduit 12 they are substantially cooled to permit handling thereof, if necessary. They are then sterile on the inside but not sterile on the outside due to the fact that the outer surface sterility was lost as the cans passed through the water cooler 11. If desired the sterilizers 2 and 2' and the water cooler 11 may be mounted so that the valves 3 rotate about a vetrical axis rather than a horizontal axis, as illustrated in Figure 1, that is, the valves may be mounted so that they appear as illustrated in Figure 1 when seen in plan rather than in elevation. The particular constructions of the sterilizers and coolers are not an indispensable part of the present invention, since their sole function is to sterilize the interiors of the cans and deliver such sterilized cans in a continuous flow and at a sufficiently reduced temperature to permit use of the cans. The cans may be delivered at a rate of approximately one hundred fifty to two hundred cans per minute. It is because of this high delivery rate that the water cooler is provided. If a lower delivery rate were used the cooler 11 could be omitted.

Since the cooler 11 is used it is necessary to sterilize the outside of the cans after they leave the cooler. To effect such sterilization the cans are forced through a chlorine bath 14. The cans travel down the discharge conduit and are carried through the chlorine bath by a star wheel 15 that rotates continuously in a counterclockwise direction in the bath 14. The cans are then delivered into a guideway formed by metal guide strips 16 and 17 which force the cans up and around into a working chamber 18. The chamber is hermetically sealed against the ingress of atmospheric air. To that effect the top of the chamber is continuous with a vertical wall 19 that extends below the liquid level in the chlorine bath 14. The chamber is filled with an inert sterlie gas which is preferably nitrogen, although it may consist of carbon dioxide or even presterilized air. The atmosphere within the chamber 18 is maintained at a pressure above that of the outside air, that is, above atmospheric pressure, so that if any leakage develops in any of the joints or the like of the chamber casing, that leakage will result in an outward flow of gas rather than a flow of air inwardly into the chamber. Suitable apparatus is provided for at all times indicating the pressure within the chamber 18 and maintaining it above that of the outside atmosphere.

The cans roll along the guideways 16 to a righting apparatus 22 from which they are pushed onto a traveling belt 23. It is to be noted that at the time the cans enter the chamber 18 they are sterile not only on the inside but, also, on the outside, since the chlorine bath sterilizes the outside of the can. Thus there is no danger of contamination of the inside of the chamber 18 by the continuous flow thereinto of the sealed empty cans.

The empty cans are carried along the belt 23 to a position first beneath a piercing apparatus 25. As each can comes into proper position with respect to a vertically reciprocating piercing tool 26 the piercing tool is automatically reciprocated to pierce a venting or filling hole 27 in the center of the top of the can. The cans then travel along the conveyer until they come to a star wheel 29 which receives the individual pierced cans and delivers them to a turntable of a milk can filling machine 30. Each can then travels around a circle beneath a rotating filling ring 31 that has a plurality of filling nozzles depending therefrom. Each nozzle enters the hole of a can and thereafter the can, with the filling nozzle and the rotating filling ring rotate together. The filling ring 31 consists of a pipe or header that is supplied with milk by a plurality of radial conduits 32 which are connected to a central filling pipe 33 that leads from a milk container 34. The milk in the container is presterilized, and the entire filling action takes place in the closed chamber 18 that contains the inert sterile gas under pressure. Thus there is no chance for contamination of the product. The cans are being filled as they rotate within the filling machine, together with the rotary filling ring 31. When each can is filled an automatic cut-off operates, in a manner known in the art, to stop the flow of milk into that can. When the cans approach their limit of travel the individual cans are received by a rotary star wheel 37 which delivers them to a belt 38. At the point of delivery of the respective cans to the belt 38, and immediately above the cans, there is located an automatic soldering apparatus 39 which first dries the top of the can adjacent the filling hole 27 and then solders the central filling hole, all in a manner well known in the art, and while the can is still in the sterile chamber 18. The soldered can is then rotated for discharge from the apparatus. It may be discharged in any desired manner. In order to prevent the escape of an excessive amount of gas from the chamber 18 as each can is discharged, suitable discharge valves, such as the valve 2 or the valve 11, may be used at the discharge end of the apparatus or, if desired, the cans may be discharged into a liquid bath 40 the liquid of which provides a seal against the escape of gas from the chamber 18. The filled cans are then carried through the bath 40 by a star wheel 41 and are discharged, ready for labeling. The liquid bath 40 may consist of water or, if desired, it may consist of a slightly sterilizing solution so as to prevent the migration of bacteria or microbes via the water into the discharge side of the apparatus.

The milk can filling and milk can sealing machine may be of any desired construction. One well known type of machine is that known as "The Dickerson Vent Filler and Sealer." The only difference wrought in that machine, in accordance with the present invention, is that the entire machine is enclosed in a sealed casing forming part of the chamber 18 so that the operation of the machine is under sterile conditions rather than under atmospheric conditions. Instead of filling the can with non sterile milk and thereafter sterilizing the can of milk, as was heretofore the practice, the present process calls for filling with pre-sterilized milk under sterile conditions and then sealing under sterile conditions.

In order that the atmosphere within the working chamber 18 shall be sterile it is essential that the chamber itself be sterilized before starting the canning operation. To facilitate sterilization of the chamber each of the baths 14 and 40 is provided with means for facilitating the passage of sterilizing live steam through the chamber 18 preparatory to operating the mechanism. In the case of the bath 14, there is provided a removable cover 45 that is bolted or otherwise secured to the top of the bath and into which the can discharge conduit 12 extends. When it is desired to sterilize the apparatus the discharge conduit 12 is temporarily disconnected from the bath 14, the container for the bath 14 being at that time empty, and a live steam hose is connected in its place. A similar cover arrangement is provided for the bath 40 to permit temporarily closing the opening through which the cans discharge from the bath 40 into the atmosphere. The chamber 18 can then be filled with live super heated steam which raises the temperature of the chamber and maintains the temperature elevated sufficiently to sterilize the entire interior of the chamber. Thereafter the steam may be swept out by a draft of inert sterile gas, such as was heretofore mentioned, which then fills the chamber 18. Thereafter, and before the bath tanks 14 and 40 are opened to the atmosphere, they are filled with chlorine or other sterilizing solutions that are to be used, which solutions seal the chamber 18 against the ingress of air thereinto. The inert gas within the chamber 18 may be maintained at a pressure above atmospheric pressure in any desired manner. After the liquid has been inserted into the bath 14 the can discharge chute 12 from the cooler 11 may be positioned in the bath in the manner indicated.

In filling cans with a food product such as milk or the like, the atmosphere within the chamber 18 is maintained at a temperature insufficient to burn or give an off-flavor to the product. In canning some types of liquid or semi-liquid food products an elevated temperature does not adversely affect the product. Under such circumstances the cooler 11 and the bath 14 may be entirely omitted and the cans from the sterilizer 2' may be discharged directly into the chamber 18. This is shown in the embodiment of the present invention illustrated in Figure 5.

In Figure 5 I have shown an apparatus substantially similar to that previously described except that instead of supplying the sterilizer with unpunched cans the sterilizer is provided with cans that are already vented. The can in this instance is of the same construction as the can illustrated in Figure 4, that is, it is a substantially closed can the top of which is provided with a small vent hole for filling purposes. The cans are supplied by a continuous movement into a sterilizer 2 to which they then pass to a sterilizer 2' as previously described. The cans leaving the sterilizer 2' are then sterile both inside and outside. They then move directly into the can filling and sealing machine without first resorting to the water cooler 11. Since the water cooler 11 is not resorted to, the outside of the cans remains sterile and the can therefore do not have to be passed through a sterilizing bath, such as the chlorine bath 14. The cans roll from the discharge conduit 10 directly into the can filling and sealing machine. The discharge conduit 10 is sealed against the entrance of air thereinto and is sealed to the chamber 60 which is maintained at a pressure slightly above atmospheric pressure and filled with live steam or sterile gas as heretofore. The cans roll down the discharge chute, past the righting apparatus 22, onto the belt 23, as heretofore. Since the cans are pre-punched the piercing apparatus 25 of Figure 1 is omitted, and the cans pass directly to the filler which operates in the same manner as was previously described, first to fill the can and then to solder the filling opening while the can is in a sterile atmosphere of live steam or sterile gas at a pressure preferably above atmospheric pressure.

While I have herein described a cooler 11 as one wherein water is circulated around the cans, it is within the purview of the present invention to use a cooler wherein cooled air or other inert gas is circulated around the outside of the can to cool it rapidly. Since the cans entering the cooler 11 are at an elevated temperature, the air therein is also at an elevated temperature and therefore it may, in some instances, be desirable to maintain the cooler 11 at a pressure above atmospheric pressure to prevent bulging of the cans due to the pressure of the heated air within the cans. When the cans are cooled by circulating a sterile fluid therearound, such as cool air, nitrogen gas or the like, the exterior of the can is not contaminated and thus remains sterile. Therefore, under those conditions it is possible to omit the chlorine solution 14 and pass the cans from the cooler 11 directly to the chamber 18.

The chamber 60 may be provided with any suitable means for passing live super heated steam therethrough for sterilizing the chamber preparatory to using it, it being understood that not only the atmosphere within the chamber 60 but, also, the chamber itself is maintained in a sterile condition throughout the canning operation. This includes the chamber and all of the apparatus and mechanism within it.

It is to be noted that although the atmosphere within the chamber 60 is under pressure, there can be no appreciable loss of pressure at the inlet or outlet side of the chamber 60 since the valve 2' prevents any appreciable loss of pressure at the place where the cans are admitted into the chamber and the liquid bath 40 prevents any appreciable loss of pressure at the place where the cans are discharged from the chamber 60. If desired, the sealing means 40 may be replaced by a valve similar to the valve 2' so that cans can be discharged from the chamber 60 without being wetted by a liquid, while at the same time preventing an excessive loss of pressure from the chamber 60. This may be of importance in the instances where the product that is being canned may be maintained at an elevated temperature during the canning process, without danger of burning, for when that is the case the sterile atmosphere within the chamber 60 may consist of live steam at a sufficiently elevated temperature to maintain the interior of the chamber 60 sterile, and then the liquid sealing bath 40 cannot be used because it will cause the steam to condense.

The atmosphere within the chamber 18 is maintained sterile in order to prevent contamination of the sterile product flowing into the can. If desired the sterile condition may be maintained by merely directing germicidal rays from powerful ultra violet ray lamps to the region around the filling opening 27 in the cans to maintain the portion of the can surrounding the opening sterile and to maintain the atmosphere surrounding the opening 27 sterile.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. In the art of canning, the method which comprises, moving a sealed empty can through a hot sterilizing chamber which is at a temperature sufficiently high to sterilize the inside of the can, then moving the can through a liquid cooling bath to cool the can quickly, then advancing the can from the cooling bath into a sterile gaseous atmosphere and in said atmosphere piercing the can to form a filling opening, filling the can through said opening with a sterile product and then sealing said filling opening while the can is still in said sterile atmosphere.

2. The method of canning which comprises, providing an inside sterile sealed empty canning container at least a part of which is of material which can be soldered, then piercing the container to form a filling opening in the container while maintaining a sterile atmosphere around the part of the container where the opening is made, filling the container through the opening with a perishable product, and soldering the opening all while maintaining the region around the opening in the sterile atmosphere.

3. The method of canning which comprises, providing a sealed empty canning container, heating the sealed container to a temperature sufficient to sterilize the inside and the outside thereof, moving the container into a chamber having a sterile atmosphere, then making a filling opening in the container, filling the container with a perishable product, and sealing the opening while maintaining the container in the sterile atmosphere.

4. The method of canning a flowing type product which comprises providing an inside sterile sealed empty container having a pierceable metal top, sterilizing at least a part of the outside of the container, forming a filling opening at the sterilized part thereof, filling the container with a perishable product through said opening, and sealing the opening, and maintaining a sterile atmosphere around the container opening from the time of formation of the opening until the opening has been sealed.

5. Canning apparatus comprising means forming a chamber sealed from the outside air, the chamber being filled with a sterile atmosphere at a pressure above that of the surrounding atmosphere to prevent infiltration of air through any leaks in the chamber, means for producing a continuous flow of sealed empty sterile containers into said chamber, means in said sterile chamber for piercing each container to form a filling vent opening, machinery for filling vented containers with a perishable liquid product while the containers are in said chamber, and means in said sterile chamber for sealing the vent opening in a container.

6. The process of canning which process comprises providing a sealed empty canning container having a top of material that may be soldered, sterilizing the inside of the sealed container by heating it, then cooling the sealed container and moving the container into a sterile atmosphere where the filling operation is to take place, and in said atmosphere piercing the container to form a filling opening filling the container with a product to be canned, and then sealing the filling opening.

7. The method of canning which comprises providing a rigid sealed empty canning container of the type which can withstand an external temperature and pressure of live steam at double atmospheric pressure without injury and which sealed container has been previously sterilized inside, moving said sealed sterile container into an atmosphere which is substantially sterile, in said atmosphere forming a filling opening in the container, filling said container with a perishable product of the type which is adversely affected by air borne micro-organisms and which is devoid of all micro-organisms that cause spoilage of the product, and in said atmosphere then sealing the filling opening.

RAYMOND H. C. MOELLER.